Patented June 20, 1939

UNITED STATES PATENT OFFICE 2,163,020

PROCESS FOR STABILIZING ORGANIC HEAVY METAL SALTS

Mihai Bogdan, Ploesti, Rumania, assignor to Shell Development Company, San Francisco, Calif., a corporation of Delaware No Drawing. Original application May 3, 1938, Serial No. 205,757. Divided and this application February 6, 1939, Serial No. 254,799. In the Netherlands May 13, 1937

5 Claims. (Cl. 23—250)

This invention relates to the stabilization of heavy metal salts of relatively high molecular weight non-aromatic monocarboxylic acids which have a tendency to decolorize upon storage or exposure to air, and more particularly is concerned with inhibiting discoloration of organic heavy metal salts used for driers in paints, by the addition of small amounts of certain anti-oxidants.

This application is a division of my application Serial No. 205,757, filed May 3, 1938.

Salts of heavy metals and non-aromatic relatively high molecular weight monocarboxylic acids, i. e., having 7 or more carbon atoms, such as naphthenic acids, abietic acid, fatty acids of 7 or more carbon atoms, acids obtained in the oxidation of paraffin wax or other relatively high molecular weight non-aromatic hydrocarbons, e. g. polymers of olefines, have a variety of important uses. Thus salts of cobalt, iron, manganese, and lead are used as paint driers; copper and mercury are used as parts of insecticides and wood-preserving agents, others may be used in lubricating oils to increase the load-carrying capacity of oil films or to prevent piston ring sticking in internal combustion engines, etc. These salts may be prepared directly from the free acids or by double decomposition of their alkali metal salts. When freshly prepared from reactants having reasonable degrees of purity, the salts usually possess clear colors.

It has been found that many of the above heavy metal salts, by themselves or in solutions of suitable solvents, have a tendency to become discolored more or less rapidly upon storage in open or closed containers and more particularly when spread out as thin films on solid surfaces. The colors turn muddy dark and may even become black. Such changes in the colors are obviously highly undesirable and harmful, especially in the case of paint driers. For instance, a white paint containing lead naphthenate drier has been known to turn an unsightly gray because of the discoloration of the drier and thus become altogether unusable.

The discoloration is usually most noticeable in the case of heavy metal naphthenates, particularly those prepared with naphthenic acids originating from relatively heavy mineral oils, i. e., gas oil fractions and heavier. For example, a cobalt naphthenate which when fresh had a clear blue color turned brown within 12 hours when exposed to the atmosphere. Darkening is often accompanied by loss of other important properties such as solubility in many of their common solvents, ability to promote drying, etc.

I have discovered that this discoloration can be inhibited or at least be greatly retarded by finely distributing certain anti-oxidants throughout the salts hereinbefore described. Although the underlying reactions which are responsible for the discoloration have not been explained, it is believed that they are in some way connected with oxidation.

Particularly susceptible to the inhibiting action of the anti-oxidants described later are the naphthenates derived from petroleum naphthenic acids and abietates; and as to the various heavy metals the cobalt salts usually seem to respond most readily to the inhibitors.

Of the large class of substances known to be active anti-oxidants, p-phenylene diamine, o-phenylene diamine, p-amino-phenol, o-amino phenol, 1—2, 1—4, 1—5, 1—7 and 1—8 naphthylene diamines and amino naphthols, diphenyl thiourea, and alkyl and aralkyl derivatives thereof have been found to give the most effective protection against discoloration. Certain other well-known anti-oxidants as cetyl aniline, phenol, hydroquinone, pyrogallol, ethylene trithiocarbonate, diphenyl amine, m-phenylene diamine, m-amino naphthol, 1—3 amino naphthol, and a host of others have very little color-inhibiting power for the salts herein described, and some anti-oxidants such as the m-amino phenol, 1—3 amino naphthol, cetyl aniline, pyrogallol, etc., may even be definitely harmful, in that they accelerate rather than inhibit discoloration. Again other anti-oxidants such as beta naphthol, beta naphthyl amine, etc., have some inhibiting power, which, however, is insufficient for most practical purposes.

Mixtures of active anti-oxidants are often more effective than their individual components. Thus a mixture of 80% methylated p-amino phenol and 20% methylated p-phenylene diamine was one of the most effective inhibitors encountered. In some instances wood tar fractions boiling above 240° C. have given good results.

The quantities of the anti-oxidants required for effective stabilization of the metal salts are normally below 2% and usually between about 0.02 to 1% by weight of the organic acid in the salt.

The anti-oxidants may be incorporated into the salt by dissolving the latter in a suitable solvent and dissolving the inhibitor in the same solvent before, after or simultaneously with the salts; or a separate solution of the inhibitor may be added to the salt solution; or the inhibitor may be dissolved in the carboxylic acid prior to preparing the salt in cases where this does not interfere with the preparation of the salt. If a solvent was used for incorporating the anti-oxidant, after removal of the solvent by evaporation, distillation, etc., the anti-oxidant remains extremely finely distributed throughout the salt, though perhaps not in true solution.

In the following illustrative examples, the effect of the inhibitor on the color was measured by comparing the colors at different time intervals of several samples of a salt of the type described, with and without inhibitor, spread as thin films on carefully cleaned glass plates, after exposure to air.

Example I

Cobalt naphthenate was prepared by neutralizing gas oil naphthenic acids with an aqueous solution of caustic soda. The resulting solution was shaken with benzene and an equivalent amount of cobalt chloride dissolved in water. The mixture was then allowed to stand and separate. The benzene layer, which contained the cobalt naphthenate, was removed and was further diluted with benzene so that it contained exactly 2.75 gm. naphthenic acid per 10 ml. solution.

To samples of the resulting solutions various inhibitors in an amount of 1% by weight of the naphthenic acid (or less as explained below) were added. If necessary, the solutions were warmed to effect complete dissolution of the inhibitors. In some instances where the inhibitors could not be readily dissolved they were first dissolved in ethyl alcohol and the resulting solutions were added to the naphthenate solution.

6 to 7 drops of the several naphthenate solutions were then placed on glass plates and allowed to spread and dry. The plates were then exposed to air at 50° C. for several days. The colors were noted at intervals of one day. Results were as follows:

|   | Inhibitor | Color after number of days | | | | | | |
|---|---|---|---|---|---|---|---|---|
|   |   | 1 | 2 | 3 | 4 | 5 | 6 | 7 |
| 1 | Blank | a | b | c | --- | --- | --- | --- |
| 2 | p-Amino phenol˟ | a | a | a | a | a | a | a |
| 3 | Benzyl amino-p-phenol | a | a | a | a | a | a | a |
| 4 | p-Phenylene diamine | a | a | a | a | a | a | a |
| 5 | 1-amino 5-naphthol | a | a | a | a | a | a | a |
| 6 | 1-amino 7-naphthol | a | a | a | a | a | a | a |
| 7 | 1-5 naphthylene diamine | a | a | a | a | a | a | a |
| 8 | 1-8 naphthylene diamine˟˟ | a | a | a | a | a | a | a |
| 9 | Diphenyl thiourea | a | a | a | a | a | a | a |
| 10 | Beta naphthol | a | a | a | a | c | --- | --- |
| 11 | Beta naphthylamine | a | a | a | a | b | c | --- |
| 12 | Wood tar˟˟˟ | a | a | a | a | c | --- | --- |
| 13 | Diphenyl amine | a | a | c | --- | --- | --- | --- |
| 14 | Hydroquinone˟ | a | a | b | c | --- | --- | --- |
| 15 | Phenol | a | c | --- | --- | --- | --- | --- |
| 16 | Pyrogallol˟ | a | c | --- | --- | --- | --- | --- |
| 17 | m-Phenylene diamine | a | c | --- | --- | --- | --- | --- |
| 18 | 1-amino 3-naphthol | c | --- | --- | --- | --- | --- | --- |
| 19 | Ethyl tolyl sulfide | a | c | --- | --- | --- | --- | --- |
| 20 | Ethylene trithiocarbonate | b | c | --- | --- | --- | --- | --- |
| 21 | Cetyl aniline | c | --- | --- | --- | --- | --- | --- |

˟ Contains less than 1% inhibitor because of incomplete solubility.
˟˟ Contains 0.1% inhibitor.
˟˟˟ Contains 0.05% inhibitor.
a Not discolored, unchanged.
b Initial slight discoloration.
c Discolored.

Example II

Cobalt abietate was tested by the method described for the previous example. Without inhibitor the abietate was completely discolored after one day. ⅓% by weight of an inhibitor consisting of a mixture of 80% methylated p-amino phenol and 20% methylated p-phenylene diamine caused the color to remain clear for three days. On the fourth day discoloration began to appear.

Equal amounts of phenol and alkyl phenols had no inhibiting effects.

Example III

Cobalt linoleate which discolored in less than 24 hours by the test method of Example I did not discolor for several days after addition of an inhibitor consisting of a mixture of 80% methylated p-amino phenol and 20% methylated p-phenylene diamine in an amount of 1% by weight of the linoleic acid.

I claim as my invention:

1. In a process for inhibiting discoloration of a salt of a heavy metal and an organic acid selected from the group consisting of aliphatic and alicyclic monocarboxylic acids containing at least 7 carbon atoms, the step comprising finely distributing throughout said salt an anti-oxidant consisting of a diphenyl thiourea, in an amount of 0.02 to 2% by weight of said acid.

2. A salt of a heavy metal and an organic acid selected from the group consisting of aliphatic and alicyclic monocarboxylic acids containing at least 7 carbon atoms, said salt containing distributed an amount of extremely finely-divided anti-oxidant consisting of a diphenyl thiourea, said amount being between 0.02 and 2% by weight of said acid.

3. A salt of a heavy metal and naphthenic acids obtained from a mineral oil boiling not below gas oil, said salt containing distributed an amount of extremely finely divided anti-oxidant consisting of a diphenyl thiourea, said amount being between 0.02 and 2% by weight of said naphthenic acids.

4. A salt of cobalt and an organic acid selected from the group consisting of aliphatic and alicyclic monocarboxylic acids having at least 7 carbon atoms, said salt containing distributed an amount of extremely finely divided anti-oxidant consisting of a diphenyl thiourea, said amount being between 0.02 and 2% by weight of said acid.

5. A cobalt naphthenate containing distributed an amount of extremely finely divided anti-oxidant consisting of a diphenyl thiourea, said amount being between 0.02 and 2% by weight of the naphthenic acid in said cobalt naphthenate.

MIHAI BOGDAN.